US007861838B2

(12) United States Patent (10) Patent No.: US 7,861,838 B2
Ohtake et al. (45) Date of Patent: Jan. 4, 2011

(54) AUTOMATIC TRANSMISSION CONTROL APPARATUS

(75) Inventors: Isamu Ohtake, Shizuoka (JP); Hiromichi Akebono, Machida (JP)

(73) Assignee: Jatco Ltd, Fuji-shi (JP)

( * ) Notice: Subject to any disclaimer, the term of this patent is extended or adjusted under 35 U.S.C. 154(b) by 425 days.

(21) Appl. No.: 12/138,497

(22) Filed: Jun. 13, 2008

(65) Prior Publication Data

US 2009/0023552 A1 Jan. 22, 2009

(30) Foreign Application Priority Data

Jul. 19, 2007 (JP) ............................ 2007-187769

(51) Int. Cl.
*F16H 61/20* (2006.01)
*F16H 59/54* (2006.01)
(52) U.S. Cl. ..................................... 192/220.1; 477/93
(58) Field of Classification Search .............. 192/220.1; 477/93
See application file for complete search history.

(56) References Cited

U.S. PATENT DOCUMENTS 6,270,443 B1 * 8/2001 Ito et al. ..................... 477/114
7,134,538 B2 * 11/2006 Hasegawa et al. ......... 192/220.1
7,325,665 B2 * 2/2008 Kamishima et al. ...... 192/220.1

FOREIGN PATENT DOCUMENTS

JP 59034050 A * 2/1984
JP 05-087236 A 4/1993

* cited by examiner

Primary Examiner—Richard M. Lorence
(74) Attorney, Agent, or Firm—Global IP Counselors, LLP

(57) ABSTRACT

An automatic transmission control apparatus is provided with a brake switch, a brake fluid pressure detecting section, a range position detecting section, a neutral control section and a prohibiting section. The brake switch is configured to output an on-signal when a brake pedal is depressed and otherwise output an off-signal. The brake fluid pressure detecting section is configured to detect a brake fluid pressure corresponding to a brake pedal depression force. The range position detecting section is configured to detect if a traveling range of an automatic transmission is selected. The neutral control section is configured to start a neutral control that puts the automatic transmission into a neutral state when the brake fluid pressure detected by the brake fluid detecting section exceeds a start threshold value while the range position detecting section detects that the traveling range is selected, and to end the neutral control when the brake fluid pressure falls below an end threshold value while the neutral control is being executed, with the start and end threshold values being set to values that are higher than the brake fluid pressure occurring when the brake switch starts outputting the on-signal. The prohibiting section is configured to prohibit the neutral control from being subsequently started again, after the neutral control has been started by the neutral control section, regardless of the brake fluid pressure detected by the brake fluid pressure detecting section until the brake switch outputs the off-signal.

6 Claims, 4 Drawing Sheets

AUTOMATIC TRANSMISSION CONTROL APPARATUS

CROSS-REFERENCE TO RELATED APPLICATIONS

This application claims priority to Japanese Patent Application No. 2007-187769, filed on Jul. 19, 2007. The entire disclosure of Japanese Patent Application No. 2007-187769 is hereby incorporated herein by reference.

BACKGROUND OF THE INVENTION

1. Field of the Invention

The present invention generally relates to an automatic transmission control apparatus equipped with a neutral control configured to prohibit transmission of a creep torque to a drive wheel when a prescribed condition is satisfied.

2. Background Information

In a vehicle having an automatic transmission with a torque converter, a prescribed amount of torque (called "creep torque") is produced when an accelerator pedal depression amount is zero while a traveling range, e.g., Drive or Reverse, is selected. When a driver depresses a brake pedal in order to overcome the creep torque and stop the vehicle while a traveling range is selected, a neutral control is executed whereby a holding element is released and the automatic transmission is put into a neutral state in order to avoid imposing an unnecessary load on the engine.

A known method of determining when to execute and end the neutral control is use a brake switch signal. More specifically, the neutral control is started when a brake switch outputs an on-signal and ended when the brake switch outputs an off-signal.

Since the brake switch outputs the on-signal in response to even a slight amount of brake pedal depression, there are times when the neutral control is executed even though the driver does not intend to stop. A feasible way of avoiding this problem is to set the on and off threshold values of the brake switch to higher values. However, since the brake switch serves as the signal for turning the brake lamps on and off, increasing the threshold values makes the brake lamps illuminate less readily and poses a problem from a safety standpoint. In short, it is not possible to accurately detect the driver's brake depression amount (intention to stop) based on a signal from a brake switch.

In response to this issue, Japanese Laid-Open Patent Publication No. 5-87236 discloses a technology whereby the start timing and end timing of a neutral control is determined based on a brake fluid pressure of a brake pedal instead of a brake switch. In Japanese Laid-Open Patent Publication No. 5-87236, a driver's intent to stop is determined based on an operation amount (brake fluid pressure) of a brake pedal in connection with executing a creep prevention control and a neutral control. Additionally, in Japanese Laid-Open Patent Publication No. 5-87236, a different threshold value of the operation amount of the brake pedal is used for starting the neutral control than for ending the neutral control. More specifically, a threshold value A for the neutral control is set to a larger value than a threshold value B for ending the neutral control (threshold value A>threshold value B). As a result, various effects are achieved, e.g., the driving/operating performance is improved, the shock that occurs when the neutral control ends is reduced, and gear hunting is prevented from occurring when the neutral control is started and ended.

In view of the above, it will be apparent to those skilled in the art from this disclosure that there exists a need for an improved automatic transmission control apparatus. This invention addresses this need in the art as well as other needs, which will become apparent to those skilled in the art from this disclosure.

SUMMARY OF THE INVENTION

It has been discovered that in Japanese Laid-Open Patent Publication No. 5-87236, when the driver depresses the brake pedal and the brake fluid pressure becomes equal to or larger than the threshold value A, it is determined that the driver intends to stop the vehicle and the neutral control is executed, thus putting the transmission into a neutral state. As a result, the fuel economy can be improved when the vehicle speed is in the vicinity of zero. Meanwhile, when the driver releases the brake pedal and the brake fluid pressure becomes equal to or smaller than the threshold value B, it is determined that the driver intends to drive the vehicle and the neutral control is ended, thus cancelling the neutral state and enabling the vehicle to be driven.

When driving slowly, such as in congestion or when parking in a garage, a common driving technique is to utilize creep torque by repeatedly depressing and releasing the brake pedal so as to adjust the amount of creep torque transferred to the road surface.

When performing this kind of driving, there are times when the driver depresses the brake pedal to reduce the vehicle speed resulting from the transfer of creep torque. If the brake fluid pressure exceeds the threshold value A, then the neutral control will be started and the transmission will enter a neutral state resulting from the release of a starting clutch. Thus, even though the driver depressed the brake pedal intending merely to slowdown slightly, the creep torque disappears completely and the driver can not accomplish the fine adjustment of the vehicle speed that the driver originally intended. Consequently, the operability of the vehicle declines.

Afterwards when the driver releases the brake pedal in order to accelerate the vehicle, the brake fluid pressure falls below the threshold value B and the neutral control ends. The starting clutch connects and the vehicle changes from a neutral state to a creep state, thus resulting in a drive force being obtained.

When driving in congested traffic or parking in a garage, the driver makes many fine adjustments to the vehicle speed by adjusting the depression amount of the brake pedal. However, once the neutral control starts and the vehicle enters a neutral state, the neutral state cannot be ended by merely easing the depression of the brake pedal and the driver cannot achieve the desired amount of drive force by easing off the brake pedal. Consequently, in order to end the neutral control, it is necessary to fully release the brake pedal again.

With the technology presented in Japanese Laid-Open Patent Publication No. 5-87236, hunting occurs with respect to the starting and ending of the neutral control and the driver cannot fine adjust the vehicle speed when driving using creep torque. Consequently, the operability of the vehicle during driving is degraded.

The object of the present invention is provide an automatic transmission control apparatus configured to suppress hunting with respect to starting and ending a neutral control and make it possible for a driver to fine adjust the vehicle speed when driving using creep torque.

In order to achieve the object mentioned above, an automatic transmission control apparatus is provided that basically comprises a brake switch, a brake fluid pressure detecting section, a range position detecting section, a neutral control section and a prohibiting section. The brake switch is configured to output an on-signal when a brake pedal is depressed and otherwise output an off-signal. The brake fluid pressure detecting section is configured to detect a brake fluid pressure corresponding to a brake pedal depression force. The range position detecting section is configured to detect if a traveling range of an automatic transmission is selected. The neutral control section is configured to start a neutral control that puts the automatic transmission into a neutral state when the brake fluid pressure detected by the brake fluid detecting section exceeds a start threshold value while the range position detecting section detects that the traveling range is selected, and to end the neutral control when the brake fluid pressure falls below an end threshold value while the neutral control is being executed, with the start and end threshold values being set to values that are higher than the brake fluid pressure occurring when the brake switch starts outputting the on-signal. The prohibiting section is configured to prohibit the neutral control from being subsequently started again, after the neutral control has been started by the neutral control section, regardless of the brake fluid pressure detected by the brake fluid pressure detecting section until the brake switch outputs the off-signal.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
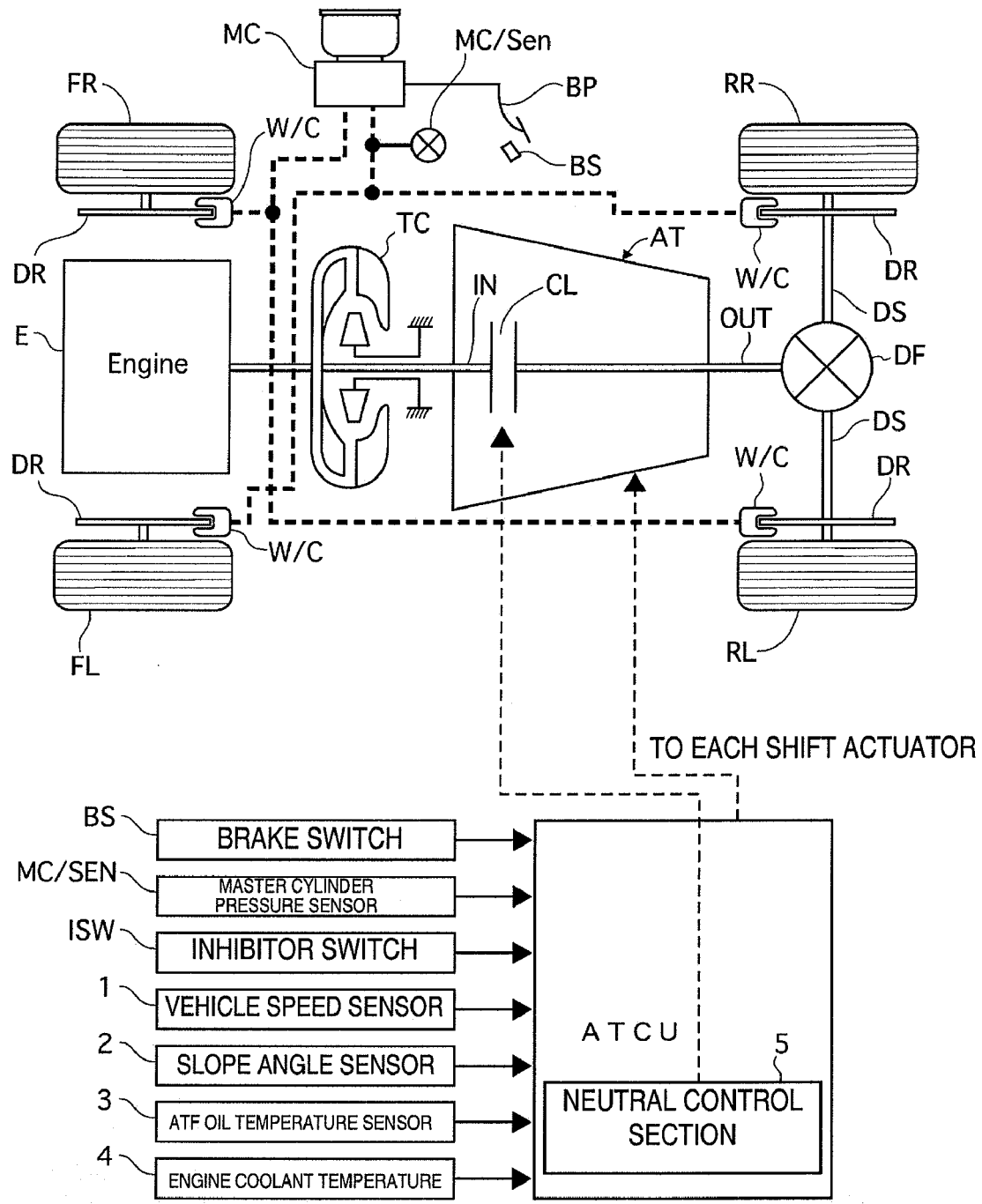
FIG. 1 is a full schematic system diagram of a vehicle equipped with an automatic transmission control apparatus in accordance with one embodiment.

Referring initially to FIG. 1, a vehicle is illustrated that is equipped with an automatic transmission control apparatus in accordance with one embodiment. Although the vehicle presented in the illustrated embodiment is a rear wheel drive vehicle, it is acceptable for the vehicle to be a front wheel drive vehicle or a four wheel drive vehicle.

Basically, the vehicle in the illustrated embodiment is equipped with an engine E, a torque converter TC and an automatic transmission AT. A drive force outputted from the engine E is transmitted through the torque converter TC to an input shaft IN of the automatic transmission AT. A starting clutch CL is provided inside the automatic transmission such that a drive force transmitted through the starting clutch CL is transmitted from an output shaft OUT to a differential DF. The differential DF transfers the drive force to a pair of drives shafts DS of the left and right rear wheels RR and RL such that the drive force is transmitted to the rear wheels RR and RL.

The automatic transmission AT sets a gear ratio in accordance with a traveling state, thereby increasing or reducing the rotational speed of the output shaft OUT with respect to the rotational speed of the input shaft IN. If the automatic transmission AT is a standard step-type automatic transmission (not a continuously variable transmission), then one of the holding members used to achieve first gear is the starting clutch CL. If the automatic transmission AT is a continuously variable transmission, then a frictional element such as a forward clutch or a reverse brake provided in a forward/reverse switching mechanism will serve as the starting clutch CL.

A disc rotor DR is attached to each of the front wheels FR and FL such that it can rotate integrally therewith. Likewise, a disc rotor DR is attached to each of the rear wheels RR and RL such that it can rotate integrally therewith. A brake caliper configured to press a brake pad against the disc rotor DR so as to impart a frictional braking force is mounted in the vicinity of each of the disc rotors DR. A wheel cylinder W/C is provided inside each brake caliper and serves to determine the force with which the brake pad is pressed against the disc rotor DR (i.e., determine the frictional brake force).

Each of the wheel cylinders W/C is connected to a master cylinder MC via a brake fluid tube. The master cylinder MC is an element that generates a brake pressure corresponding to a brake pedal depression force resulting when a driver operates a brake pedal BP is a so-called tandem master cylinder. The brake fluid tubing has an X-configuration (diagonally split) such that one hydraulic circuit of the master cylinder is connected to the right front wheel FR and the left rear wheel RL and the other hydraulic circuit of the master cylinder is connected to the left front wheel FL and the right rear wheel RR.

A master cylinder pressure sensor MC/SEN detects a master cylinder pressure is provided in the master cylinder hydraulic circuit that is connected to the left front wheel FL and the right rear wheel RR. The brake switch BS is provided on the brake pedal BP. In addition to being used for a neutral control of the automatic transmission, the brake switch BS serves as a trigger for illuminating a brake lamp that serves to indicate that the driver is depressing the brake pedal.

An automatic transmission controller ATCU is provided to determine which gear the automatic transmission AT will be shifted to, based on various input data and outputs a control command signal to actuators in order to achieve the determined gear (or gear ratio). Also, a neutral control section 5 is provided inside the automatic transmission controller ATCU. The neutral control section 5 controls the connection and release of the starting clutch CL based on various input data. More specifically, the neutral control section 5 releases the starting clutch CL when a neutral control is executed and connects the starting clutch CL when the neutral control is not executed.

With the illustrated embodiment, after the neutral control is started, the neutral control is prohibited from being started again until the brake switch BS outputs the off-signal. After the start condition for neutral control is satisfied, the vehicle is either in a state in which the neutral control is in progress (being executed) or a state in which the neutral control has been ended. If the neutral control has been ended but the brake switch BS is outputting the on-signal, then it can be assumed that the driver is fine adjusting the vehicle speed by operating the brake pedal. By prohibiting the neutral control from starting again, hunting related to starting and ending the control can be avoided and fine adjustment of the vehicle speed can be accomplished when driving while utilizing creep torque. As a result, the driving performance of the vehicle can be improved.

The automatic transmission controller ATCU preferably includes a microcomputer with a neutral control program that controls the automatic transmission AT as discussed below. The automatic transmission controller ATCU 20 also includes other conventional components such as an input interface circuit, an output interface circuit, and storage devices such as a ROM (Read Only Memory) device and a RAM (Random Access Memory) device as needed and/or desires. It will be apparent to those skilled in the art from this disclosure that the precise structure and algorithms for the automatic transmission controller ATCU can be any combination of hardware and software that will carry out the functions of the automatic transmission controller ATCU as discussed herein.

The signals fed to the automatic transmission controller ATCU include an on-off signal of the brake switch BS, a master cylinder pressure signal from the master cylinder pressure sensor MC/SEN, a range position signal of an inhibitor switch ISW indicating a shift lever position selected by a driver, a vehicle speed signal from a vehicle speed sensor 1, a slope angle signal from a slope angle sensor 2 that detects a grade of a road surface on which the vehicle is traveling, an oil temperature signal from an ATF oil temperature sensor 3 that detects an oil temperature inside the automatic transmission AT, and a coolant temperature signal from an engine coolant temperature sensor 4 that detects a coolant temperature of the engine E.

The inhibitor switch ISW outputs signals indicating the forward traveling range positions (D, L, 1, 2, etc.), the reverse traveling range position (R), the neutral range position (N), and the parking range position (P). In this embodiment, the term "traveling range" refers to both the forward traveling ranges and the reverse traveling range.

Figure 2:
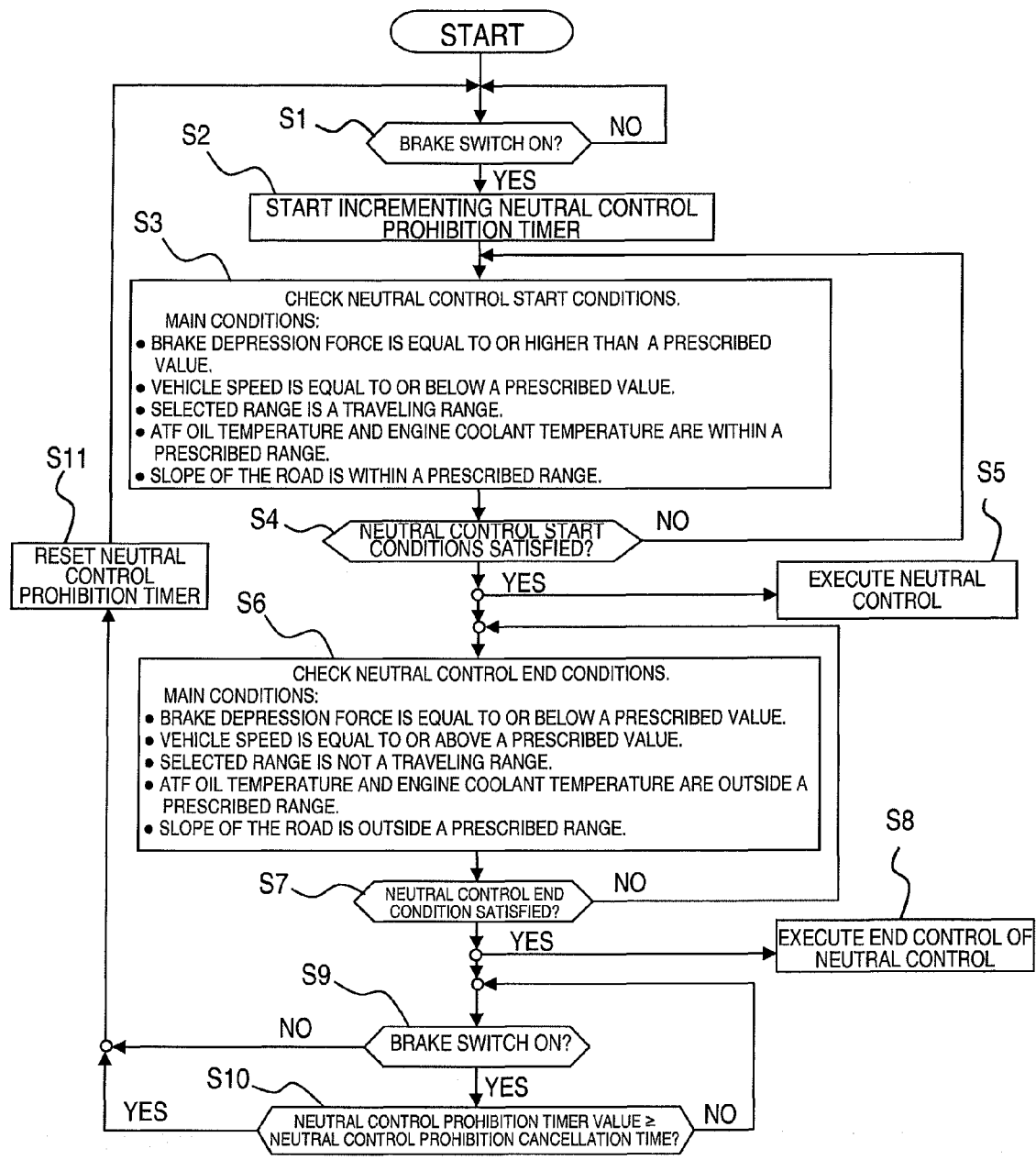
FIG. 2 is a flowchart showing a control executed by a neutral control section in the illustrated embodiment of FIG. 1.

FIG. 2 is a flowchart showing the control operations executed by the neutral control section 5.

In step S1, the neutral control section 5 determines if the brake switch BS is "on". If so, the neutral control section 5 proceeds to step S2. Otherwise, the neutral control section 5 repeats step S1.

In step S2, the neutral control section starts incrementing a neutral control prohibition timer. The incrementing of the neutral control prohibition timer is not related to the control cycle time or flow of the flowchart and is executed independently.

In step S3, the neutral control section 5 determines if some prescribed neutral control start conditions are satisfied. All of the conditions listed below must be satisfied in order to start the neutral control.

Condition 1: The brake depression force is equal to or higher than a prescribed value (the master cylinder pressure is equal to or above a start threshold value).

Condition 2: The vehicle speed is equal to or below a prescribed value.

Condition 3: The selected range is a traveling range.

Condition 4: The ATF oil temperature and the engine coolant temperature are within a prescribed range.

Condition 5: The slope of the road is within a prescribed range.

Since it is necessary for the driver to be indicating an intent to stop, the start threshold value of Condition 1 is set to a value higher than the value at which the brake switch BS starts outputting the on-signal. Condition 2 is included because an engine braking effect cannot be obtained if the automatic transmission is put into a neutral state while the vehicle speed is high. Condition 3 is included because the transmission is inherently in a neutral state in ranges other than the traveling ranges.

Condition 4 is included because an appropriate viscosity cannot be obtained if the ATF oil temperature is not within a prescribed range and the connection and release control of the neutral control cannot be executed precisely if the viscosity is not appropriate. If the engine coolant temperature is not within a prescribed range, then it is necessary to lower the temperature of the coolant and it is better to lower the engine rotational speed in order to lower the coolant temperature. The engine rotational speed will decrease more readily if a load is acting on the engine than if the transmission is in a neutral state.

Condition 5 is included because there are situations in which the vehicle will carry an acceleration component resulting from the force of gravity if the road slope is not within a prescribed range and, in such a situation, the vehicle could move in the direction of the slope if the transmission is put into a neutral state while the master cylinder pressure is insufficient.

In step S4, the neutral control section 5 determines if all of the neutral control start conditions were found to be satisfied. If so, the neutral control section 5 proceeds to steps S5 and S6. Otherwise, the neutral control section 5 repeats step S3.

In step S5, the neutral control section 5 executes the neutral control. The neutral control is a control that serves to release the starting clutch CL while a traveling range is selected. The control is configured to release the starting clutch CL gradually because the driver will likely feel a sudden loss of torque if the clutch CL is released abruptly. The neutral control is executed as appropriate based on a control logic that is separate from the control loop shown in the flowchart until the starting clutch CL is completely released. Then, after the starting clutch CL is completely released, the neutral control is ended in an appropriate fashion.

In step S6, the neutral control section 5 determines if some prescribed neutral control end conditions are satisfied. The neutral control section determines that the neutral control should be ended if any of the conditions listed below is satisfied.

Condition 6: The brake depression force is equal to or below a prescribed value (the master cylinder pressure is equal to or below an end threshold value).

Condition 7: The vehicle speed is equal to or above a prescribed value.

Condition 8: The selected range is not a traveling range.

Condition 9: The ATF oil temperature and the engine coolant temperature are outside a prescribed range.

Condition 10: The slope of the road is outside a prescribed range.

Since it is necessary for the driver to be cancelling an intent to stop, the end threshold value of Condition 6 is set to a value smaller than the start threshold value and higher than the value at which the brake switch BS starts outputting the on-signal. As a result, control hunting is prevented. Conditions 7 to 10 are included for the opposite reasons as conditions 2 to 5 and explanations thereof are omitted here.

In step S7, the neutral control section 5 determines if a neutral control end conditions was found to be satisfied. If so, the neutral control section 5 proceeds to steps S8 and S9. Otherwise, the neutral control section 5 repeats step S6.

In step S8, the neutral control section 5 executes a neutral control end control. The neutral control end control is a control that serves to reconnect the released starting clutch CL. The end control is configured to connect the starting clutch CL gradually so as to suppress connection shock and torque fluctuations imparted to the drive wheels as a result of connecting the starting clutch CL. The end control is executed as appropriate based on a control logic that is separate from the control loop shown in the flowchart until the starting clutch CL is completely connected. Then, after the starting clutch CL is completely connected, the neutral control is ended in an appropriate fashion.

In step S9, the neutral control section 5 determines if the brake switch BS is outputting the on-signal. If so, then the neutral control section 5 proceeds to step 10. Otherwise, the neutral control section 5 proceeds to step S11.

In step S10, the neutral control section determines if the value of the neutral control prohibition timer is larger than a preset neutral control prohibition cancellation time. If so, then the neutral control section 5 proceeds to step S11. Otherwise, the neutral control section 5 returns to step S9.

Steps S9 and S10 combine to form a prohibiting section that prohibits the neutral control from being started.

In step S11, the neutral control section 5 resets the neutral control prohibition timer and returns to step S1 so as to repeat the control loop as a whole.

Figure 3:
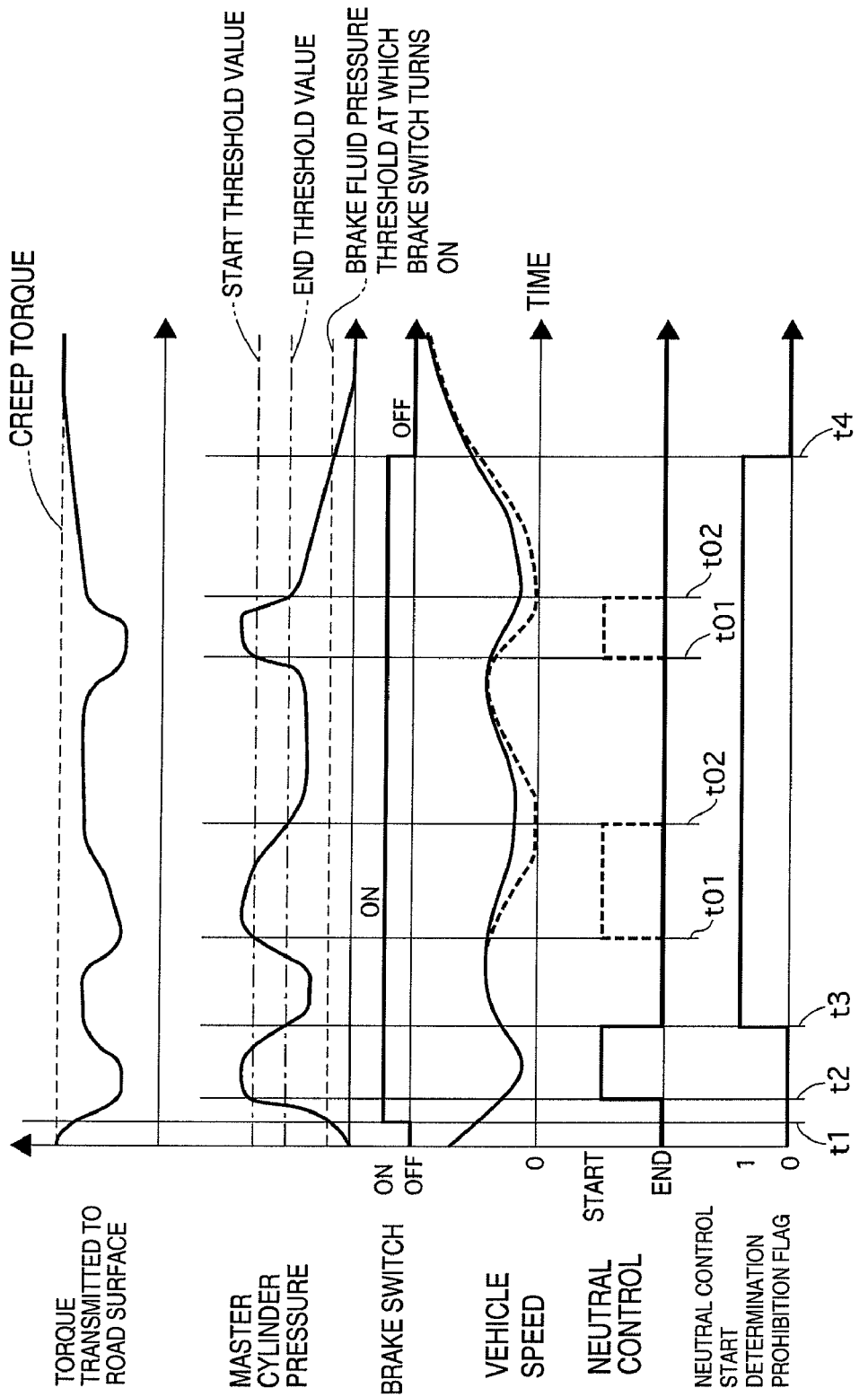
FIG. 3 is a time chart illustrating a situation in which the neutral control starts due to a driver decelerating while driving in congestion and, afterwards, the driver fine adjusts the vehicle speed by adjusting the depression force exerted against the brake pedal BP while maintaining a depressed state (i.e., not releasing the brake pedal BP).

The operational effects obtained with the control scheme contrived as just described will now be explained. FIG. 3 is a time chart for a situation in which the neutral control starts due to the driver decelerating while driving in congestion and, afterwards, the driver fine adjusts the vehicle speed by adjusting the depression force exerted against the brake pedal BP while maintaining a depressed state (i.e., not releasing the brake pedal BP). It is assumed that all of Conditions 2 to 5 are satisfied and all of the conditions 7 to 10 are not satisfied.

At a time t1, the driver, starts to depress the brake pedal BP and the brake-switch BS issues the on-signal. At this point in time, the neutral control prohibition timer starts incrementing. Although the brake switch BS does not operate based on the master cylinder pressure, it is clear from the figure that output of the on-signal starts at a very low master cylinder pressure value.

At a time t2, the driver depresses the brake pedal BP more strongly in order to further reduce the vehicle speed and the master cylinder pressure increases beyond the start threshold value. When this occurs, all of the neutral control start conditions are satisfied and the neutral control is started.

At a time t3, the driver eases the depression of the brake pedal BP to recover some vehicle speed and the master cylinder pressure decreases to a value below the end threshold value. When this occurs, a neutral control end condition is satisfied and the neutral control ends. The control will now be explained further using a neutral control start determination prohibition flag. This flag does not actually appear in the steps of the flowchart; it is used only in the explanation of the time chart because it makes it easier to explain the state of the control.

If the neutral control section 5 determines in step S7 that a neutral control end condition is satisfied, then it proceeds to step S9 repeats steps S9 and S10 until the brake switch BS outputs the off-switch or until the neutral control prohibition timer exceeds the prohibition cancellation time in step S10. In other words, determination of whether the neutral control should be started or ended is completely prohibited. Consequently, the period during which the steps S9 and S10 are repeated is equivalent to a neutral control start determination prohibition flag being set to 1.

In the illustrated embodiment, during a period in which the neutral control start determination prohibition flag is set to 1, the neutral control is not executed even if the master cylinder pressure changes and exceeds the start threshold value or falls below the end threshold value. As a result, hunting related to starting and ending the control can be avoided and fine adjustment of the vehicle speed can be accomplished when driving while utilizing creep torque, thus enabling the driving performance of the vehicle to be improved.

The dotted-line curve shown in the neutral control start/end section of FIG. 3 is a time chart illustrating a comparative example. If the neutral control is executed based solely on the relationship between the master cylinder pressure and the start and end threshold values, then neutral control will be executed frequently and the vehicle speed will decrease excessively due to the neutral state, as illustrated with the dotted-line curve of the vehicle speed. As a result, it will be difficult to fine adjust the vehicle speed and the drivability of the vehicle will be degraded. Conversely, with a control according to the illustrated embodiment, the vehicle speed does not decrease excessively and the vehicle speed can be fine adjusted easily.

At a time t4, the driver releases the brake pedal BP and attempts to accelerate. Since the brake switch outputs the off-signal in step S9, the neutral control start determination prohibition flat is reset to 0. As a result, when the driver depresses the brake pedal BP again, the neutral control section 5 can execute the neutral control start determination again.

Figure 4:
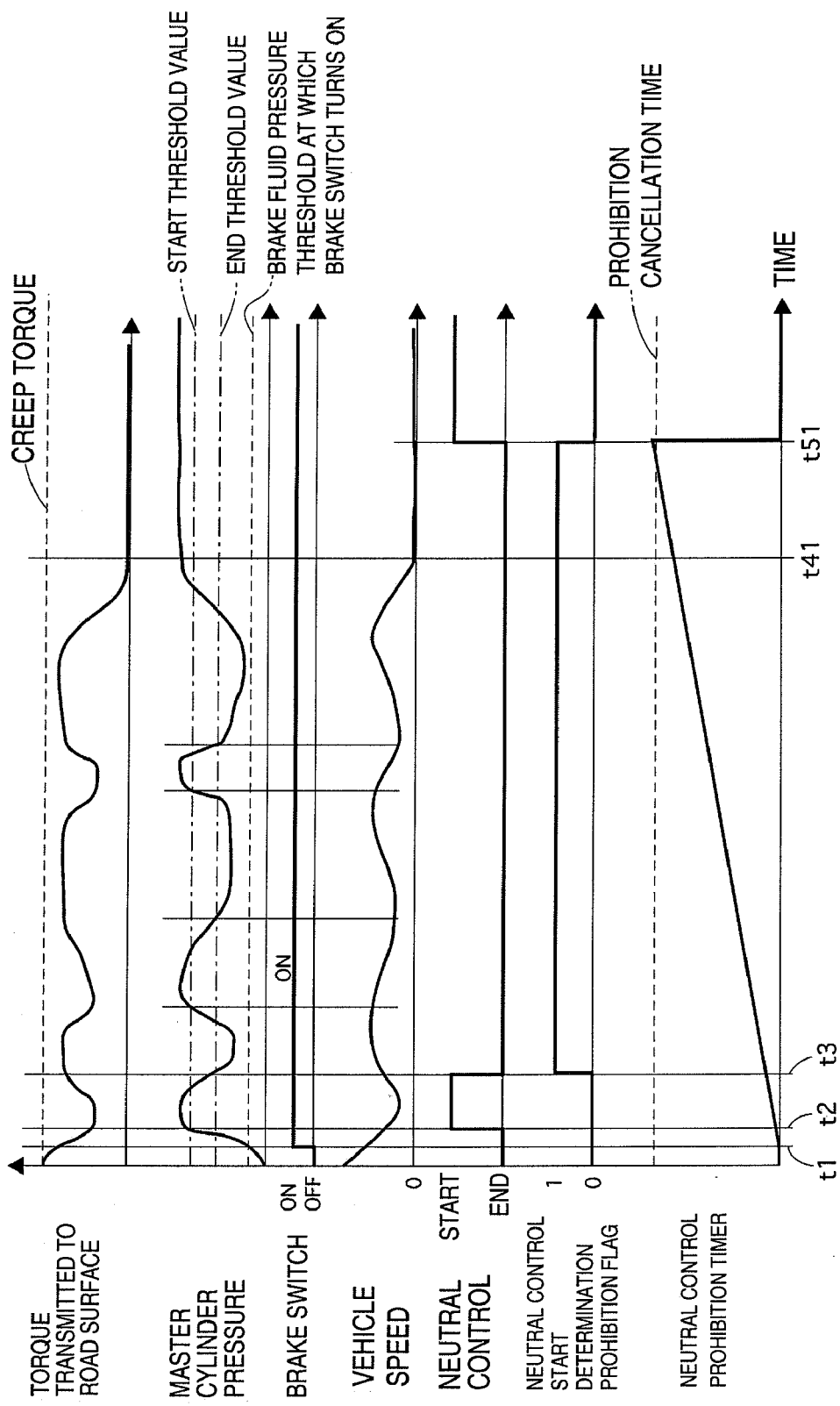
FIG. 4 is a time chart illustrating a situation in which the neutral control starts due to the driver decelerating while driving in congestion and, afterwards, the driver fine adjusts the vehicle speed by adjusting the depression force exerted against the brake pedal BP while maintaining a depressed state (i.e., not releasing the brake pedal BP). Then, still afterwards, the driver depresses the brake pedal BP again and stops the vehicle.

FIG. 4 is a time chart for a situation in which the neutral control starts due to the driver decelerating while driving in congestion and, afterwards, the driver fine adjusts the vehicle speed by adjusting the depression force exerted against the brake pedal BP while maintaining a depressed state (i.e., not releasing the brake pedal BP). Then, still afterwards, the driver depresses the brake pedal BP again and stops the vehicle. Explanations of the portions from the time t1 to the time t3 are omitted because those portions are the same as in FIG. 3.

At a time t4, the driver depresses the brake pedal BP strongly and brings the vehicle to a complete stop. Since the neutral control start determination is prohibited at this point, the neutral control is not executed.

At a time t5, the value of the neutral control prohibition timer (which started incrementing at the time t1) surpasses a preset prohibition cancellation time and the neutral control section 5 determines that the driver clearly intends to completely stop the vehicle. Therefore, the neutral control start determination prohibition flag is reset to 0. In other words, the neutral control section 5 starts determining if the neutral control should be started. At this point in time, Condition 1 is satisfied because the driver is depressing the brake pedal BP with such that the master cylinder pressure is higher than the start threshold value. Therefore, the neutral control starts.

In other words, even if the brake switch BS continues to output the on-signal, the neutral control start determination can be resumed when the neutral control prohibition timer reaches a value indicating that the prohibition cancellation time has elapsed. As a result, excessive limitation of the neutral control can be avoided.

Although the present invention is explained herein based on the illustrated embodiment, the invention is not limited to specific constituent features of the embodiment described above. For example, although in the illustrated embodiment the various sensor signals are fed to the automatic transmission controller ATCU, it is acceptable to connect the automatic transmission controller ATCU to a brake controller or the like with a CAN communication line and feed various sensor signals that are received by the brake controller to the automatic transmission controller ATCU through the CAN communication line.

Although in the illustrated embodiment the brake pedal depression force exerted by the driver is detected by detecting the master cylinder pressure, it is acceptable to provide a depression force sensor on the brake pedal BP or to provide a wheel cylinder pressure sensor configured to detect a wheel cylinder pressure.

Although in the illustrated embodiment a brake switch signal is used to cancel the prohibition of the neutral control start determination, the invention is not limited to using a brake switch. For example, it is acceptable to cancel the prohibition when a value corresponding to the brake pedal depression force exerted by the driver falls below a prescribed value that is smaller than the start threshold value or the end threshold value.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, components that are shown directly connected or contacting each other can have intermediate structures disposed between them. The functions of one element can be performed by two, and vice versa. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic transmission control apparatus comprising:
    a brake switch configured to output an on-signal when a brake pedal is depressed and otherwise output an off-signal;
    a brake fluid pressure detecting section configured to detect a brake fluid pressure corresponding to a brake pedal depression force;
    a range position detecting section configured to detect if a traveling range of an automatic transmission is selected;
    a neutral control section configured to start a neutral control that puts the automatic transmission into a neutral state when the brake fluid pressure detected by the brake fluid detecting section exceeds a start threshold value while the range position detecting section detects that the traveling range is selected, and to end the neutral control when the brake fluid pressure falls below an end threshold value while the neutral control is being executed, with the start and end threshold values being set to values that are higher than the brake fluid pressure occurring when the brake switch starts outputting the on-signal; and
    a prohibiting section configured to prohibit the neutral control from being subsequently started again, after the neutral control has been started by the neutral control section, regardless of the brake fluid pressure detected by the brake fluid pressure detecting section until the brake switch outputs the off-signal.

2. The automatic transmission control device recited in claim 1, further comprising
    a canceling section configured to cancel the prohibition executed by the prohibiting section when a prescribed amount of time has elapsed since the prohibiting section started to prohibit the neutral control from being started.

3. The automatic transmission control device recited in claim 2, wherein
    the neutral control section is further configured to set the start threshold value to a value smaller than the end threshold value.

4. The automatic transmission control device recited in claim 1, wherein
    the neutral control section is further configured to set the start threshold value to a value smaller than the end threshold value.

5. An automatic transmission control apparatus comprising:
    brake switch means for outputting an on-signal when a brake pedal is depressed and otherwise output an off-signal;
    brake fluid pressure detecting means for detecting a brake fluid pressure corresponding to a brake pedal depression force;
    range position detecting means for detecting if a traveling range of an automatic transmission is selected;
    neutral control means for starting a neutral control that puts the automatic transmission into a neutral state when the brake fluid pressure detected by the brake fluid detecting means exceeds a start threshold value while the range position detecting means detects that the traveling range is selected, and for ending the neutral control when the brake fluid pressure falls below an end threshold value while the neutral control is being executed, with the start and end threshold values being set to values that are higher than the brake fluid pressure occurring when the brake switch starts outputting the on-signal; and prohibiting means for prohibiting the neutral control from being subsequently started again, after the neutral control has been started by the neutral control means, regardless of the brake fluid pressure detected by the brake fluid pressure detecting means until the brake switch means outputs the off-signal.

6. An automatic transmission control method comprising:

detecting operating of a brake pedal;

detecting a brake fluid pressure corresponding to a brake pedal depression force;

detecting if a traveling range of an automatic transmission is selected;

starting a neutral control that puts the automatic transmission into a neutral state upon detecting the brake fluid pressure exceeding a start threshold value while the traveling range is detected as being selected, and for ending the neutral control when the brake fluid pressure falls below an end threshold value while the neutral control is being executed, with the start and end threshold values being set to values that are higher than the brake fluid pressure occurring when the brake pedal is determined to be depressed; and prohibiting the neutral control from being subsequently started again, after the neutral control has been started, regardless of the brake fluid pressure that is being detected until the brake pedal is determined to be released.

* * * * *